United States Patent [19]

Wright

[11] 4,295,269

[45] Oct. 20, 1981

[54] TRUSS ASSEMBLY APPARATUS

[76] Inventor: Ronald F. Wright, 6901 Glen Hills Rd., Fort Worth, Tex. 76118

[21] Appl. No.: 44,060

[22] Filed: May 31, 1979

[51] Int. Cl.[3] .............................................. B23P 19/00

[52] U.S. Cl. ...................................... 29/798; 29/281.3; 100/913; 227/152; 269/910

[58] Field of Search .............. 29/432, 716, 798, 281.1, 29/281.3; 100/DIG. 13; 144/288 C; 227/152; 269/228, 244, 321 F

[56] References Cited

U.S. PATENT DOCUMENTS

| | | | |
|---|---|---|---|
| 3,094,958 | 6/1963 | Gruetjen | 269/228 X |
| 3,243,177 | 3/1966 | Christman et al. | 269/321 F |
| 3,255,943 | 6/1966 | Sanford | 100/DIG. 13 |
| 3,538,843 | 11/1970 | Lubin | 227/152 X |
| 3,711,007 | 1/1973 | Fry | 227/152 X |
| 3,964,738 | 6/1976 | Owen | 269/228 X |
| 4,024,809 | 5/1977 | Moehlenpah | 100/DIG. 13 |
| 4,044,093 | 8/1977 | Jureit et al. | 269/321 F |
| 4,063,498 | 12/1977 | Labellarte | 269/321 F |
| 4,089,107 | 5/1978 | Sanford | 29/798 |
| 4,104,962 | 8/1978 | Castillo | 100/DIG. 13 |

*Primary Examiner*—Ervin M. Combs
*Attorney, Agent, or Firm*—Gerald G. Crutsinger; John F. Booth; Harry C. Post, III

[57] ABSTRACT

A truss assembly apparatus (10) comprises an elongate table (12) with a presser carriage (14) supported for movement along the table. The carriage (14) supports a roller (116) for embedding fastener plates into precut truss members positioned on the table (12). Two clamping assemblies (40) are mounted on the table (12) to define a pair of truss assembly zones and an intermediate truss transfer zone. Each clamping mechanism (40) is selectively actuated to effect positive clamping engagement of the precut truss members or semi-complete truss positioned therein. A plurality of lift means (80, 100) are mounted in the table (12) for facilitating advancement of the truss during assembly.

12 Claims, 10 Drawing Figures

FIG. 8
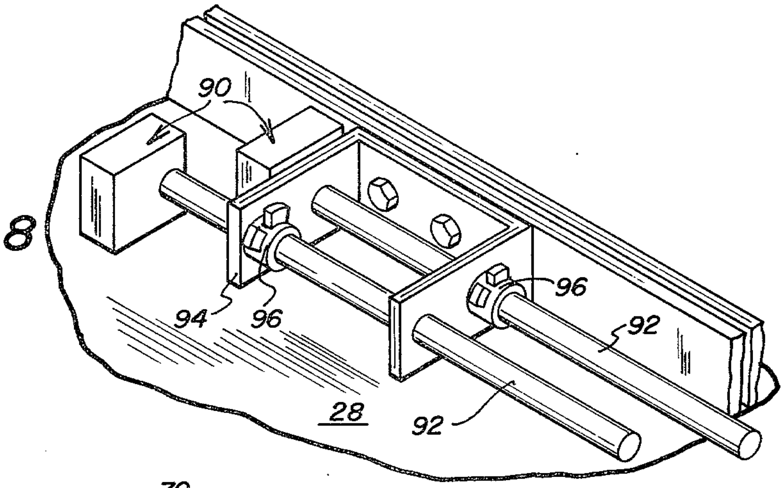
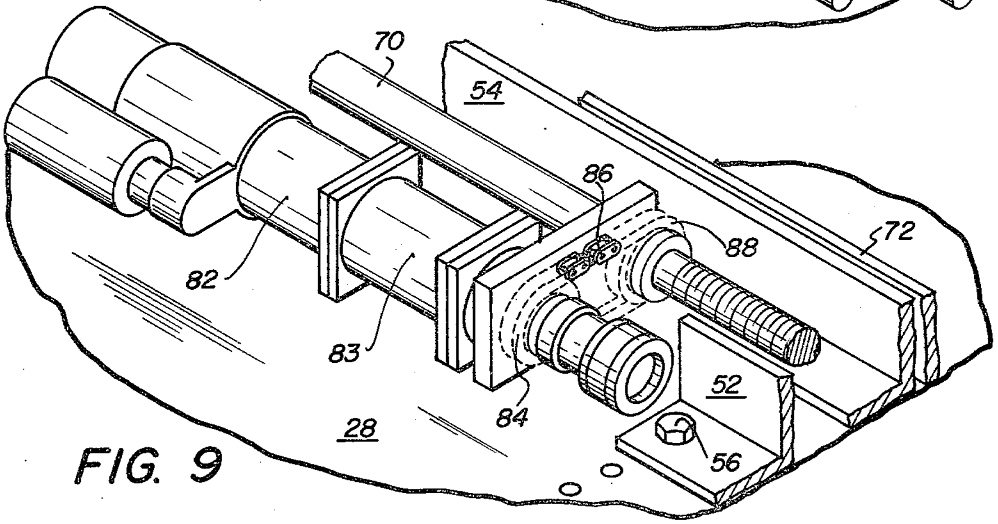
FIG. 9
FIG. 10
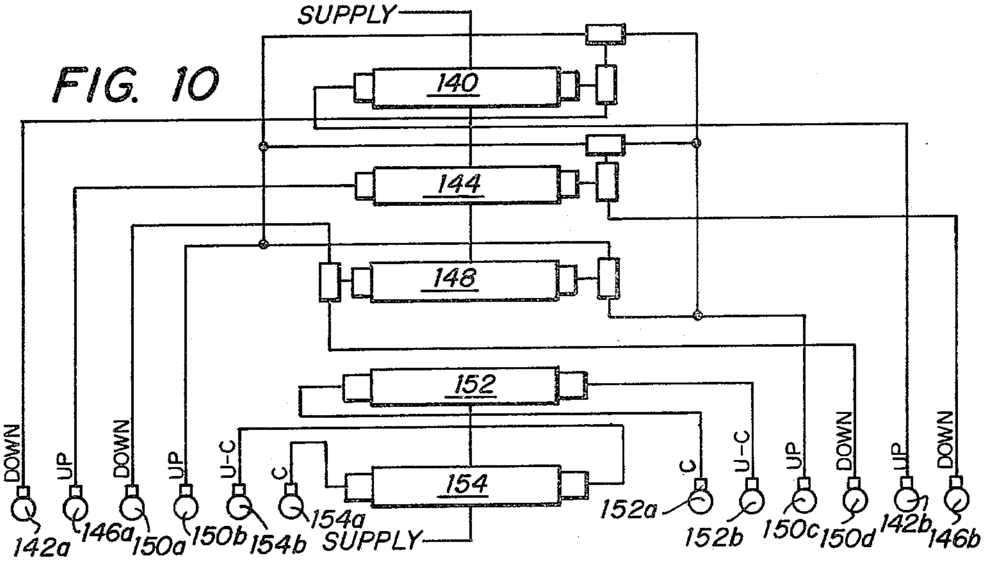

TRUSS ASSEMBLY APPARATUS

TECHNICAL FIELD

The present invention relates in general to an apparatus for fabricating structural components. More particularly, this invention concerns an apparatus for assembling precut members into floor and roof trusses.

BACKGROUND ART

Many prefabricated structures are now being utilized in the construction industry. Such structures are typically assembled at a remote manufacturing facility and then transported to the job site for incorporation into the building. The use of prefabricated structures can result in substantial cost savings by decreasing the amount of time and labor required to complete a project. In addition, such structures are generally more lightweight and efficiently engineered than their on-site assembled counterparts.

Prefabricated trussed rafters for use as roof or floor supports are examples of components which are widely used today. Such trusses are assembled from precut wooden chord and web members positioned in abutting relationship and connected together.

Although trusses of this type can be fabricated by hand on a production line basis, several truss assembly machines have been developed for performing this task semi-automatically. In general, the precut wooden members are positioned manually over a support surface and clamped in place, after which toothed fastener plates are laid over or under the abutting joints. The fastener plates are then pressed into the wooden members to secure the joints on one side, after which the semi-complete truss is turned over and similarly secured at the joints on the opposite side.

Various arrangements of tables and press rollers have been employed in the truss assembly devices of the prior art. One approach has been to pass the truss with its support surface and clamps through a pair of press rollers or under a roller mounted on the floor between two table sections. Another approach has been to provide a traveling press which is supported on the floor for travel along a table and across the truss positioned thereon.

The prior truss assembly machines, however, have several shortcomings. Because the relationship between the press roller and truss is critical to successful operation of such machines, slight variations in the floor surface can cause improper connection of or damage to a truss. The prior machines have therefore required extremely flat floor surfaces and frequent maintenance for adjusting alignment. Other machines are adapted for assembling only roof trusses or floor trusses, but not both types at the same time. The capabilities of these machines are somewhat limited. Heretofore there has not been available a truss assembly machine in which the camber to be set in the truss can be adjusted conveniently and positively. The clamping mechanisms utilized by the prior machines have also been found inadequate in terms of adjustability, positive actuation and the like. In addition, the prior machines have been relatively slow in operation because wasteful motion by the workmen has been necessary.

There is thus a need for a new and improved truss assembly machine.

DISCLOSURE OF INVENTION

The present invention comprises an apparatus for assembling trussed rafters which overcomes the foregoing and other difficulties associated with the prior art. In accordance with the invention, there is provided a truss assembly apparatus which includes a movable presser carriage supported for movement along a table having clamping means thereon. The clamping means divide the table into two assembly zones and an intermediate transfer zone. The presser carriage is attached to and supported completely by the table for reciprocable movement thereover. Construction of the invention thus eliminates from the uniform operation of the apparatus the criticality of floor variation.

In accordance with more specific aspects of the invention, an apparatus for assembling prefabricated trusses comprises an elongate table supporting a movable presser carriage. The table is preferably constructed of sections connected end-to-end so that the desired number of trusses of various types can be connected by a single pass of the presser carriage thereover. Each table section includes a pair of novel clamping assemblies mounted thereon to define three longitudinal zones.

Precut chord and web members are positioned by workmen on one side of the table into the first zone, where they are clamped in place so that connector plates can be positioned over the joints of the assembly. Following passage of the presser carriage thereover to embed the connector plates, the assembly is unclamped and flipped over into the second zone, from which it is advanced into the third zone by workmen on the other side of the table while the first zone is reloaded. After placement of another set of connector plates over the joints on the opposite side of the assembly, return passage of the presser carriage and release of the clamping means, the completed truss is removed from the third zone for subsequent use.

Preferably, each zone on the table includes selectively operated lifters to facilitate advancement of the assembly between the zones. In accordance with the preferred construction of the invention, each clamping means is independently actuated and adjustable to impart a predetermined pressure and camber to the truss structure.

BRIEF DESCRIPTION OF DRAWINGS

A more complete understanding of the invention can be had by referring to the following Detailed Description in conjunction with the accompanying Drawings, wherein:

FIG. 8 is a perspective view of the end stops of the invention;

FIG. 9 is a perspective illustration of the clamping mechanism actuator of the invention; and FIG. 10 is a diagram of the pneumatic control circuit of the invention.

DETAILED DESCRIPTION

Figure 1:
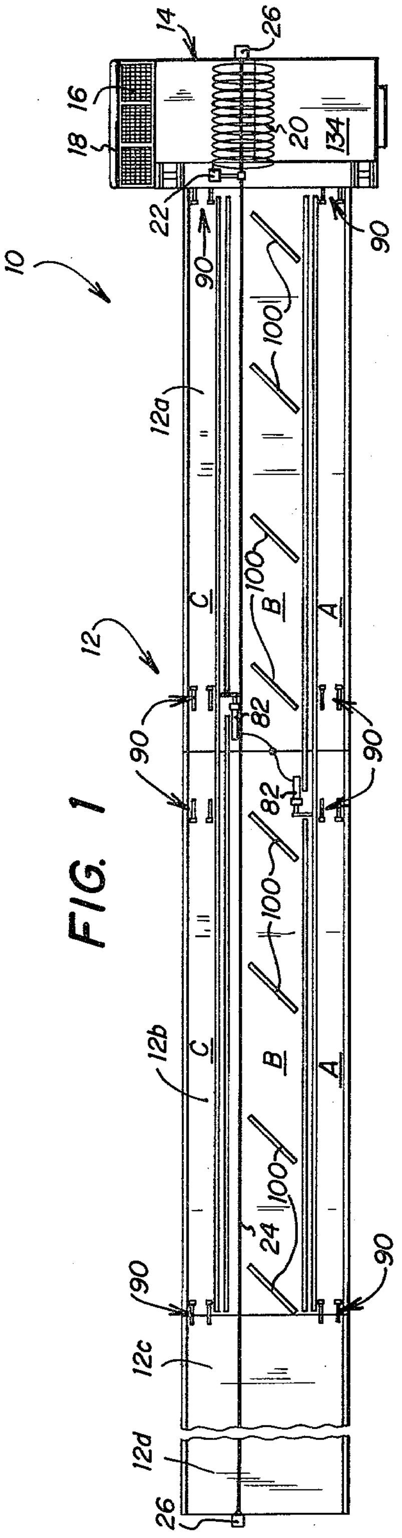
FIG. 1 is a top view of a truss assembly apparatus incorporating the invention.
Figure 2:
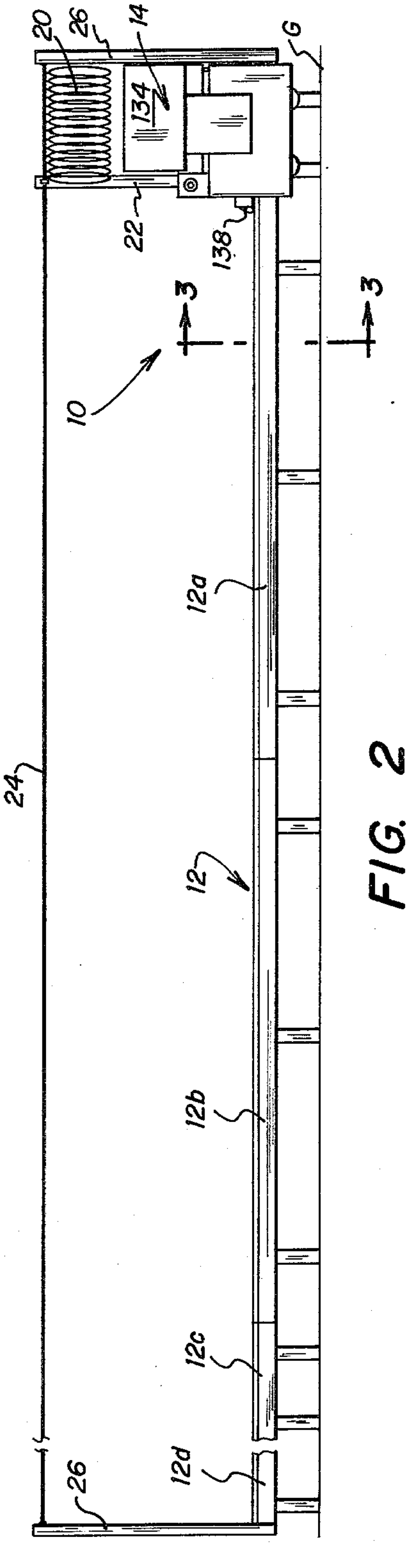
FIG. 2 is a side view of the apparatus shown in FIG. 1.

Referring now to the Drawings, wherein identical reference numerals designate like or corresponding parts throughout the several views, and particularly referring to FIGS. 1 and 2, there is shown a truss assembly apparatus 10 embodying the invention. Apparatus 10 comprises a system for the semi-automatic manufacture of trussed rafters for deck, floor or roof supports. With apparatus 10, such prefabricated structural components can be produced more efficiently and at reduced cost.

Apparatus 10 comprises a jig table 12 and a presser carriage 14 supported on the table for movement therealong. The table 12 rests on floor G and is preferably of sectionalized construction. As illustrated, table 12 includes table sections 12*a*, 12*b*, 12*c* and 12*d* connected in end-to-end relationship. Table sections 12*a* and 12*b* are main table sections each about 20 feet in length. Table section 12*c* is a stage section of about 5 feet length, and table section 12*d* is an optional auxiliary table section of about 20 feet length. The capability of apparatus 10 can thus be increased by adding more table sections to extend table 12. If desired, however, table 12 can be of single section construction.

Presser carriage 14 straddles table 12 and is supported thereby for movement along the table. A stand 16 and guard rail 18 are provided on carriage 14 for the operator thereof. Power for carriage 14 is received from a coiled power cord 20 which is connected at one end to a mast 22 mounted on the carriage. Power cord 20 is slidably suspended on a line 24 extending above table 12 between two posts 26 attached at opposite ends thereof.

Carriage 14 includes a press and functions to travel along table 12 interconnecting the joints of the trusses assembled on the table with each pass of the carriage thereover, as will be explained more fully hereinafter.

Figure 3:
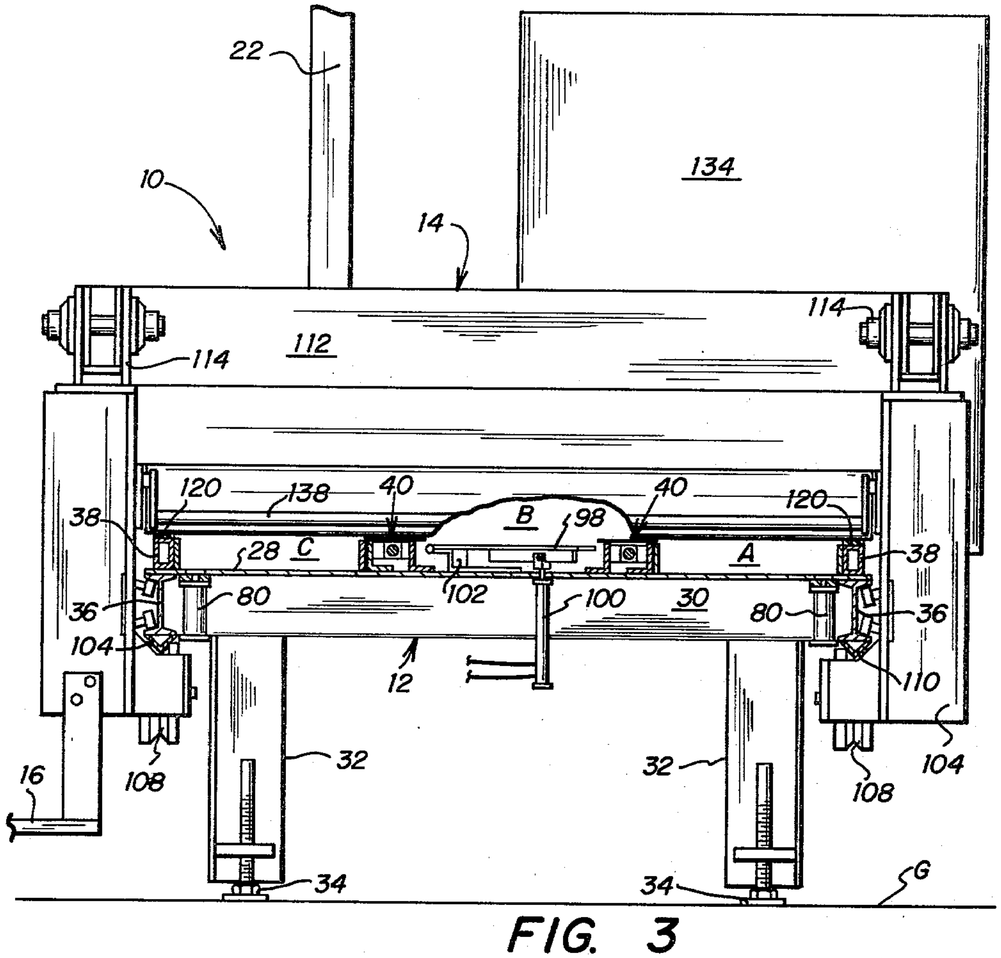
FIG. 3 is an enlarged partial sectional view taken along lines 3—3 of FIG. 2 in the direction of the arrows.

Further constructional details of table 12 can be seen in FIG. 3. Each section of table 12 includes an elongate support plate 28 resting upon a plurality of cross members 30 which are mounted on legs 32. In accordance with the preferred construction, each leg 32 includes a foot 34 which is threadedly secured thereto to allow for floor adjustment and leveling of table 12. A side beam 36 extends beneath each side edge of plate 28 and across the ends of cross members 30. Side members 38 extend longitudinally along table 12 at opposite sides of plate 28. It will thus be apparent that a recessed area is defined on table 12 by side members 38 and support plate 28.

Figure 4:
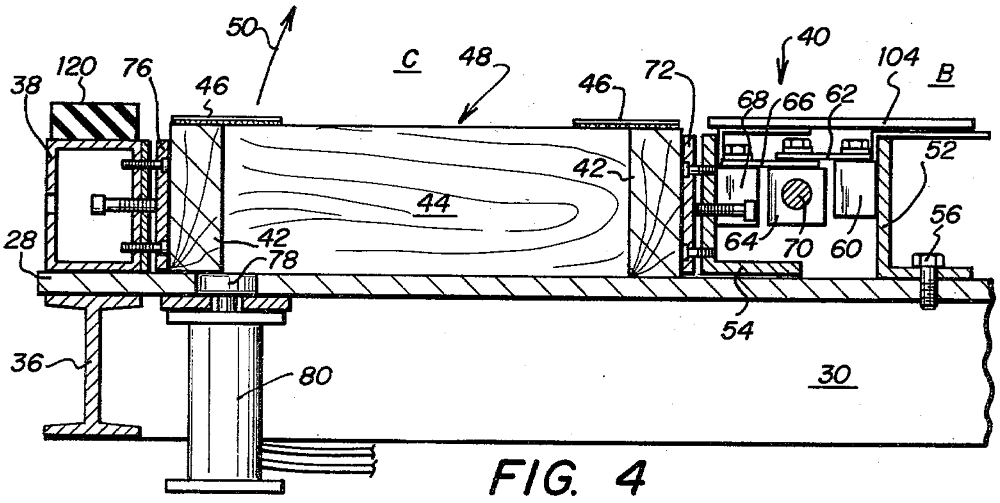
FIG. 4 is an enlarged view of a portion of FIG. 3.

Referring to FIGS. 3 and 4 simultaneously, table 12 is divided into three longitudinal zones by positioning means, such as clamping assemblies 40. In the preferred embodiment, two clamping assemblies are mounted on support plate 28. Intermediate of zone B extends between clamping assemblies 40. Assembly zones A and C extend between side members 38 and clamping assemblies 40.

During operation of apparatus 10, precut chord members 42 and web members 44 are manually positioned in one of the zones A or C and secured in place by the corresponding clamping assembly 40. Toothed or barbed fastener plates 46 are then placed over the joints on the upper or lay-up side of the truss members, and subsequently embedded in place by presser carriage 14. The semi-finished truss 48 is then lifted up and flipped inward as indicated by arrow 50 into zone B so that the embedded fastener plates are positioned downwardly. The semi-finished truss 48 is then advanced into the other zone A or C, clamped in place, and secured at the joints on the finish side with connector plates embedded therein by the return passage of presser carriage 14 to complete the truss, which can then be removed from apparatus 10 and stacked.

If desired, one set of fastener plates 46 can be positioned first on table 12 followed by truss members 42 and 44 and another set of fastener plates thereover so that a complete truss 48 can be fabricated in each of the zones A and C with each pass of carriage 14.

Figure 6:
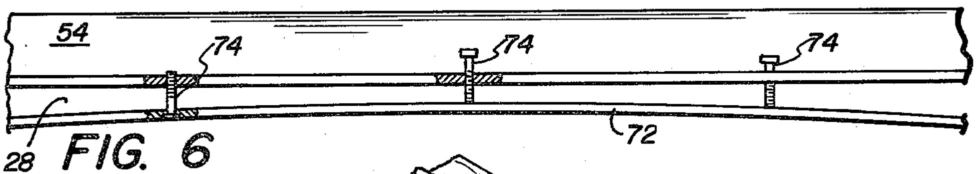
FIG. 6 is an illustration of the adjustable camber feature of the invention.
Figure 5:
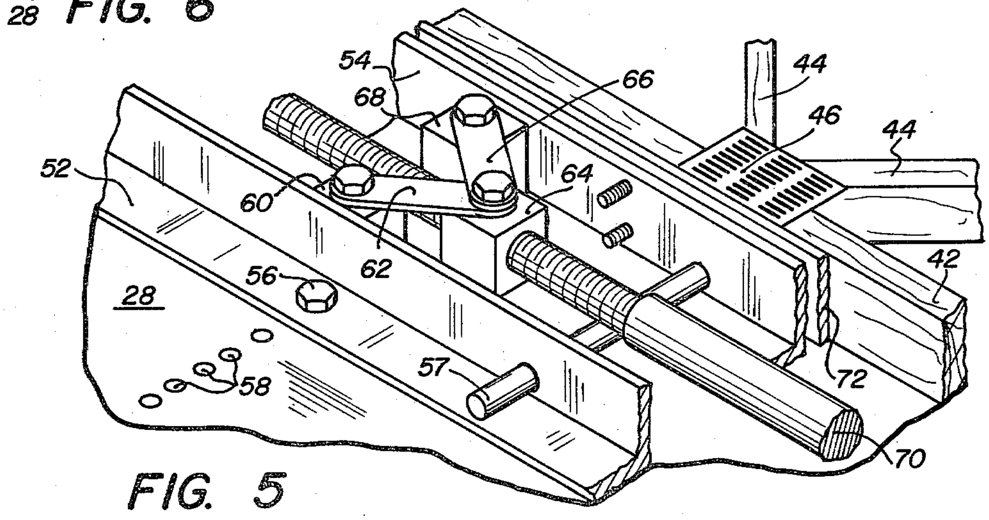
FIG. 5 is a perspective view of a portion of the clamping mechanisms of the invention.

The details of clamping assemblies 40 are best illustrated in FIGS. 4–6. Each clamping assembly 40 includes a pair of inner and outer longitudinal braces 52 and 54, which may be angle irons for example. Inner brace 52 is attached to plates 28 with a plurality of bolts 56. Outer brace 54 is slidable on plate 28, and guide rods 57 (only one of which is shown) extend from brace 54 through brace 52 for stabilization. Preferably, a plurality of holes 58 are formed in plate 28 in a transverse direction across table 12 to provide for adjustable spacing between each clamping assembly 40 and the corresponding side member 38.

Several toggle type mechanisms are connected at spaced intervals between braces 52 and 54. Block 60 fixed to brace 52 is connected by link 62 to traveling block 64, which is also connected by link 66 to block 68 fixed to brace 54. Traveling block 64 is threadedly mounted on a drive shaft 70. Brace 54 is thus caused to positively move inward or outwardly on plates 28 responsive to the rotational direction of shaft 70.

A rail 72 is mounted on the inside face of brace 54. Rail 72 and brace 54 are positively interconnected by a plurality of threaded fasteners or bolts 74 extending therebetween at regular longitudinally spaced intervals. This feature is particulary useful in those applications wherein it is desired to form a predetermined camber into the truss. This arrangement of rail 72 and fasteners 74 is advantageous because it enables the camber to be positively adjusted and set substantially continuously along the length of the truss 48 being assembled.

Referring again to FIG. 4, the inside face of each side member 38 can also be provided with a rail 76 attached thereto with a plurality of fasteners in a fashion similar to rail 72 of clamping assembly 40. Both sides of truss 48 can thus be provided with a predetermined curvature therein by camber rails 72 and 76 of apparatus 10.

In accordance with the preferred construction of the invention, table 12 includes a plurality of lift pads 78 mounted at longitudinally spaced intervals adjacent to each side member 38 in zones A and C. Each pad 78 is actuated by a double acting cylinder 80 which is preferably of the pneumatic type. The lift pads 78 and actuators 80 for each zone A and C are preferably actuated in unison but independently of the pads in the other zone. Lift pads 78 thus serve the purpose of raising the truss 48 so that it can be flipped into intermediate zone B or removed from table 12.

FIG. 9 shows the actuator which apparatus 10 utilizes for each clamping assembly 40. A motor 82 is supported on plate 28 inwardly of inner brace 52. Motor 82 is coupled to a speed reducer 82 having a drive sprocket 84 which is interconnected by chain 86 to a sprocket 88 mounted on shaft 70. In the preferred embodiment, motor 82 is of the pneumatic type, however, any suitable motor can be utilized.

It will be understood that apparatus 10 uses a separate actuator for each clamping assembly 40. This permits the clamping pressure in zones A and C to be set as necessary. For example, it has been found that a relatively higher clamping pressure is desirable when fastening the joints on the second or finish side of a semi-complete truss. Independent actuation of clamping assemblies 40 thus comprises another significant feature of the invention.

The longitudinal boundaries of assembly zones A and C are defined by side members 38 and clamping assemblies 40, while the transverse ends of the zones are defined by stops 90 shown in FIG. 8. One set of stops 90 is provided at each end of zones A and C, as is best shown in FIG. 1. Fixed or adjustable clamps can also be used, if desired. In the preferred embodiment, each stop 90 includes a slidable rod 92 which is guided by a bracket 94 attached to table 12 and locked in place by a rotatable cam 96 mounted on the rod. Stops 90 do not apply any pressure to truss 46, but merely serve the purpose of holding the truss in place and preventing endwise mislocation thereof.

Referring again to FIG. 3, zone B comprises an intermediate area between assembly zones A and C. To facilitate transfer of an inverted truss into the second assembly zone, table 12 is preferably provided with a plurality of pivotal arms 98 at longitudinally spaced intervals down zone B. Each arm 98 is actuated by a double acting cylinder 100 and is hinged at one end to a bracket 102 attached to table 12 between clamping assemblies 40. In the preferred embodiment, cylinders 100 are of the pneumatic type, however, any suitable actuators can be used. If desired, a number of plates 104 can be mounted over brackets 52 and 54 of each clamping assembly 40, as shown in FIG. 4, to prevent hangup of a truss. When the workmen are ready for a truss, arms 98 are actuated to urge the truss into one of the zones A or C, depending upon the directional orientation of the arms.

Figure 7:
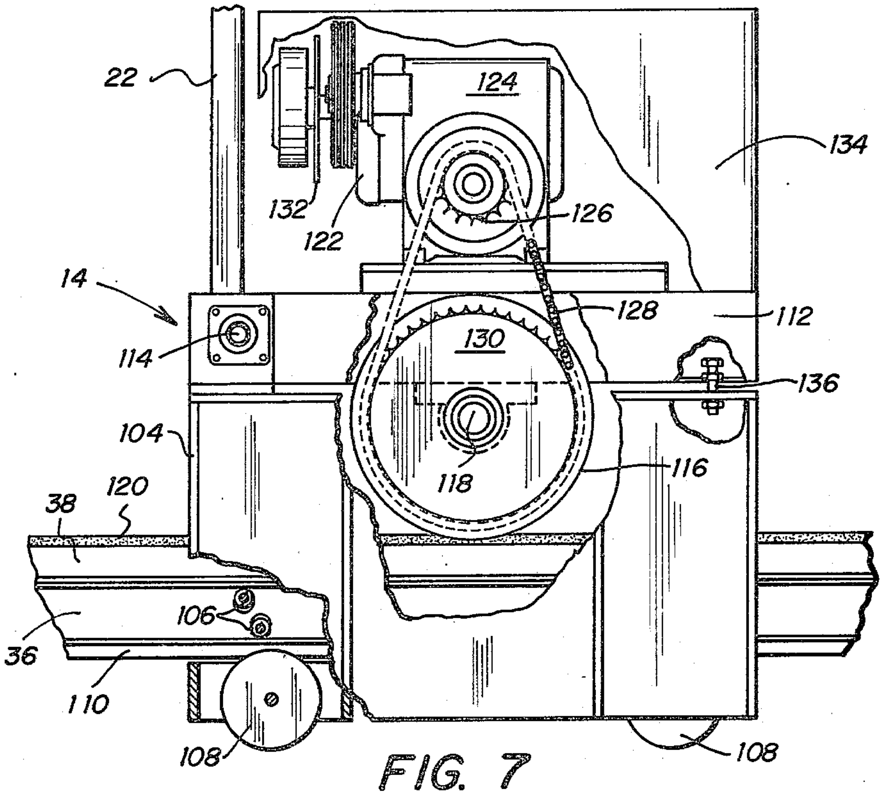
FIG. 7 is an enlarged side view (partially cut away) of the presser carriage of the invention.

The constructional details of presser carriage 14 can best be seen in FIGS. 3 and 7. Carriage 14 includes a generally C-shaped main body 104. A pair of follower bearings 106 and a V-groove bearing 108 are rotatably supported at each corner of carriage 14. Follower bearings 106 are engaged between the outer flanges of side beams 36, while bearings 108 engage guides 110 secured to the underside of the side beams. Presser carriage 14 is thus positively constrained for movement along table 12.

A frame 112 is connected to body 104 at pivots 114. A press roller 116 is rotatably supported on a shaft 118 journaled for rotation on frame 112. Roller 116 engages elastomeric pads 120 mounted on the upper surfaces of side members 38 on table 12. Rotation of roller 116 is selectively effected by a motor 122 coupled to a speed reducer 124, which in turn is coupled to a drive sprocket 126, chain 128 and roller 130. A brake 132 is connected to motor 122 for arresting rotation of roller 116. The drive train for carriage 14 is preferably enclosed within a housing 134, as shown in FIGS. 1–3, for safety purposes. A set screw 136 is connected between 112 and body 104 at the opposite end from pivot 114 to adjust the spacing between table 12 and roller 116. If desired, a spacer (not shown) can be used between frame 112 and body 104 so that carriage 14 can be readily adjusted between two truss thicknesses, such as 1.5 and 2.0 inches for example.

It will thus be apparent that travel of carriage 14 is effected through driving engagement between elastomeric pads 120 on table 12 and roller 116 mounted on the carriage. Appropriate controls (not shown) are provided on carriage 14 for manipulation by the operator on stand 16. As carriage 14 travels along table 12, roller 116 functions to press the connector plates into the joints of the trusses positioned on the table. Floor trusses located in end zones A and C of table sections 12*a* and 12*b*, as well as any roof or pitch truss located on table section 12*d*, will thus be secured during the same pass of carriage 14.

Rolling contact between roller 116 and table 12 enables carriage 14 to advance continuously along the table. In some applications, it may be desirable to mount a fluid-powered press on carriage 14 and advance the carriage in increments along table 12. It will be understood that a roller, press or combination of both can be mounted on carriage 14.

In accordance with the preferred construction of apparatus 10, a pivotal safety bar 138 and associated limit switch (not shown) are mounted on one and preferably both ends of carriage 14 to extend across table 12. Bar 138 functions to deactuate motor 122 and apply brake 132 to stop carriage 14 upon engaging stops at the ends of table 12 or foreign objects lying on the table.

FIG. 10 comprises a schematic diagram of the pneumatic control circuitry in apparatus 10. Cylinder 140, representing cylinders 80 actuating lift pads 78 in zone A, is controlled by push buttons 142*a* and 142*b* mounted on table 12. Cylinder 144, representing cylinders 80 actuating lift pads 78 in zone C, is controlled by push buttons 146*a* and 146*b* mounted on table 12. Cylinder 148, which represents cylinders 100 actuating pivotal arms 98 in zone B, is controlled by push buttons 150*a, b, c* and *d.* Motors 152 and 154, representing motors 82 of clamping assemblies 40, are individually controlled by push buttons 152*a* and 152*b,* and 154*a* and 154*b,* respectively. In the diagram, "C" means clamp and "U-C" means unclamp.

From the foregoing, it will be understood that the present invention comprises a novel truss assembly apparatus having several advantages over the prior art. One significant advantage involves the fact that criticality of floor variations has been eliminated by supporting the presser carriage directly on the table. This also provides more usable floor space beneath and around the table. Another advantage is that the clamping assemblies are independently controlled and easily adjustable to apply the pressure and camber desired. Other advantages will suggest themselves to those skilled in the art.

Although particular embodiments of the invention have been illustrated in the accompanying Drawings and described in the foregoing Detailed Description, it will be understood that the invention is not limited to the embodiments disclosed, but is intended to embrace any alternatives, modifications, and rearrangements and/or substitutions of elements as fall within the spirit and scope of the invention.

I claim:

1. Apparatus for assembling trusses from precut truss members and fastener plates, said apparatus comprising: an elongate table having a work surface thereon;

a rigid support means supporting the table from a support surface such as the floor with the work surface in an elevated position above the support surface;

a pair of elongate side members secured to said table, said side members positioned to protrude above the work surface on the table and to extend in a spaced apart relationship, each side member having a support surface thereon which is positioned above the work surface, said side members and work surface defining a recess of sufficient size to receive therein said precut truss members and fastener plates for assembly into trusses by said apparatus;

carriage means supported above the work surface of said table and mounted for movement therealong;

press roller means mounted for pressing said fasterner plates into said truss members and for rolling movement along said side members, said press roller means spanning the recess between said side members and engaging said support surface on each of said side members, said roller means being supported in a position spaced above said work surface, means rotatably connecting said press roller means to said carriage for effecting both carriage movement and said rolling movement of said press roller means along the support surfaces on said side members for contacting and pressing said fastener plates into truss members located in said recess; and means for selectively effecting movement of said carriage and press roller means along said table.

2. The apparatus of claim 1 additionally comprises resilient material mounted on said side members and wherein said support surfaces are formed on said resilient material.

3. The apparatus of claim 1 additionally comprising positioning means located in said recess for positioning precut truss members during assembly.

4. The apparatus of claim 3, wherein said positioning means comprises a pair of clamp means mounted on said table in said recess in a spaced apart relationship.

5. The apparatus of claim 4, wherein the area within each clamp means comprises a truss assembly zone and the area between said clamp means comprises an intermediate truss transfer zone, and further including:

a plurality of lift means mounted on said table at spaced locations along each truss assembly zone for selectively raising each truss in said zone away from said table.

6. The apparatus of claim 1 wherein said carriage means comprises:

a main body;

a frame with said press roller means being supported on said frame;

means for pivotally connecting said frame to said main body; and means for selectively adjusting the pivotal positioning of said frame relative to said main body to control the relationship between said press roller and work surface on said table.

7. The apparatus of claim 1, including:

a plurality of lift means provided at longitudinally spaced points in the table for selectively raising each truss away from said table.

8. The apparatus of claim 3, wherein the positioning means on the table comprises a clamp, and further including:

a rail extending adjacent to the clamp on the side thereof facing the truss to be clamped; and means for adjustably interconnecting said rail and clamp at a plurality of spaced locations therealong to provide for positive camber adjustment.

9. The apparatus of claim 8, including:

means for adjustably securing said clamp means to said table at a plurality of predetermined locations across said table.

10. The apparatus of claim 8, wherein said clamp means comprises:

a first elongate member rigidly secured to said table;

a second elongate member resting on said table and extending adjacent to said first member in spaced relationship therewith;

a plurality of toggle mechanisms interconnecting said first and second members at spaced locations therealong, each of said mechanisms including a traveling block; and a drive shaft drivingly interconnecting the traveling blocks of said toggle mechanisms, said clamp actuator means being coupled to said drive shaft.

11. The apparatus of claim 3, wherein the positioning means on the table comprises clamp means, and further including means for selectively actuating said clamp means, which comprises:

a drive shaft extending adjacent to said clamp;

a plurality of toggle mechanisms positioned at spaced locations along said clamp;

each of said toggle mechanisms including a first link pivotally interconnecting said clamp and a traveling block threadedly mounted on said drive shaft, and a second link pivotally interconnecting said traveling block and the table; and means for selectively effecting rotation of said drive shaft.

12. The apparatus of claim 1, wherein said carriage means includes a frame with an upper portion extending across the table and side portions extending downwardly from the ends of the upper frame portion, said carriage means being discontinuous on the underside of said table whereby said carriage means does not interfere with said support means during movement therealong.

* * * * *

UNITED STATES PATENT AND TRADEMARK OFFICE

CERTIFICATE OF CORRECTION

PATENT NO. : 4,295,269

DATED : October 20, 1981

INVENTOR(S) : Ronald F. Wright

It is certified that error appears in the above-identified patent and that said Letters Patent are hereby corrected as shown below:

In Column 4, line 66, change "82" to -- 83 --.

Signed and Sealed this

***Nineteenth* Day of *January 1982***

[SEAL]

*Attest:*

GERALD J. MOSSINGHOFF

*Attesting Officer* *Commissioner of Patents and Trademarks*